United States Patent
Madtha et al.

(10) Patent No.: US 9,804,880 B2
(45) Date of Patent: Oct. 31, 2017

(54) RESERVATION FOR A MULTI-MACHINE APPLICATION

(71) Applicant: VMWARE, INC., Palo Alto, CA (US)

(72) Inventors: Jivan Madtha, Pune (IN); Amit Ratnapal Sangodkar, Pune (IN); Makarand Ramesh Gawade, Pune (IN); Nafisa Mandliwala, Pune (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/821,829

(22) Filed: Aug. 10, 2015

(65) Prior Publication Data

US 2016/0371108 A1  Dec. 22, 2016

(30) Foreign Application Priority Data

Jun. 16, 2015 (IN) .......................... 3006/CHE/2015

(51) Int. Cl.
G06F 9/455 (2006.01)
H04L 29/08 (2006.01)

(52) U.S. Cl.
CPC .......... *G06F 9/45558* (2013.01); *H04L 67/10* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 9,485,219 | B1* | 11/2016 | Emelyanov | H04L 63/0272 |
| 2006/0053491 | A1* | 3/2006 | Khuti | H04L 63/02 |
| | | | | 726/23 |
| 2008/0208972 | A1* | 8/2008 | Chou | H04L 67/14 |
| | | | | 709/204 |
| 2011/0045498 | A1* | 2/2011 | Lindberg | G01N 35/00029 |
| | | | | 435/7.21 |
| 2013/0080480 | A1* | 3/2013 | Mao | H04L 41/5009 |
| | | | | 707/803 |
| 2013/0080638 | A1* | 3/2013 | Di Benedetto | H04L 47/70 |
| | | | | 709/226 |
| 2014/0053150 | A1* | 2/2014 | Barnett | G06F 9/455 |
| | | | | 718/1 |
| 2014/0165060 | A1* | 6/2014 | Muller | G06F 9/45533 |
| | | | | 718/1 |
| 2014/0280738 | A1* | 9/2014 | Kolker | H04L 12/462 |
| | | | | 709/218 |
| 2014/0321472 | A1* | 10/2014 | Jiang | H04L 12/4641 |
| | | | | 370/408 |
| 2015/0106804 | A1* | 4/2015 | Chandrashekhar | H04L 45/741 |
| | | | | 718/1 |

(Continued)

*Primary Examiner* — Charles Swift
*Assistant Examiner* — Zhi Chen

(57) ABSTRACT

A system for a reservation for a multi-machine application can include a server virtualization engine configured to create a mixed reservation of information technology resources from a cluster of hosts including a virtual machine host and a container host. The system can include a cloud management engine configured to create a multi-machine blueprint from the mixed reservation including a virtual machine template, a container image, and a definition of networking. The cloud management engine can be configured to deploy the multi-machine blueprint to provide a multi-machine application.

17 Claims, 6 Drawing Sheets

(56) References Cited

U.S. PATENT DOCUMENTS

| | | | | |
|---|---|---|---|---|
| 2015/0124586 A1* | 5/2015 | Pani | H04L 12/18 | |
| | | | 370/219 | |
| 2015/0142878 A1* | 5/2015 | Hebert | H04L 67/10 | |
| | | | 709/203 | |
| 2015/0271011 A1* | 9/2015 | Neginhal | H04L 41/0803 | |
| | | | 370/254 | |
| 2015/0281075 A1* | 10/2015 | Park | H04L 45/745 | |
| | | | 370/392 | |
| 2015/0304236 A1* | 10/2015 | Jasperson, Jr. | G06F 3/04842 | |
| | | | 715/772 | |
| 2016/0080474 A1* | 3/2016 | Argenti | H04L 67/10 | |
| | | | 709/201 | |
| 2016/0099917 A1* | 4/2016 | Glazemakers | H04L 63/0272 | |
| | | | 726/12 | |
| 2016/0274928 A1* | 9/2016 | Linton | G06F 9/45558 | |

* cited by examiner

RESERVATION FOR A MULTI-MACHINE APPLICATION

RELATED APPLICATIONS

Benefit is claimed under 35 U.S.C. 119(a)-(d) to Foreign application Serial No. 3006/CHE/2015 filed in India entitled "RESERVATION FOR A MULTI-MACHINE APPLICATION", on Jun. 16, 2015, by VMware, Inc., which is herein incorporated in its entirety by reference for all purposes.

BACKGROUND

A data center is a facility that houses servers, data storage devices, and/or other associated components such as backup power supplies, redundant data communications connections, environmental controls such as air conditioning and/or fire suppression, and/or various security systems. A data center ma be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Virtual computing instances, such as virtual machines, virtual workloads, data compute nodes, clusters, and containers, among others, have been introduced to lower data center capital investment in facilities and operational expenses and reduce energy consumption. A virtual computing instance is a software implementation of a computer that executes application software analogously to a physical computer. Virtual computing instances have the advantage of not being bound to physical resources, which allows Virtual computing instances to be moved around and scaled to meet changing demands of an enterprise without affecting the use of the enterprise's applications.

DETAILED DESCRIPTION

Figure 1:
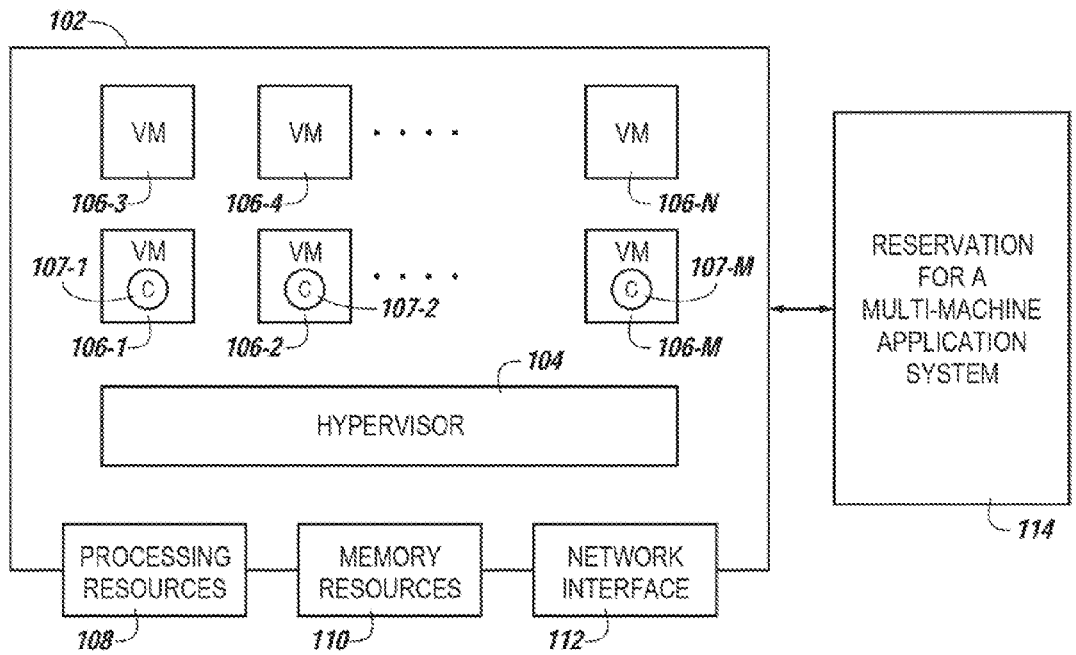
FIG. 1 is a block diagram of a host and a system for a reservation for a multi-machine application according to a number of embodiments of the present disclosure.

The term "virtual computing instance" covers a range of computing functionality. The term "virtual machine" refers generally to an isolated user space instance, which can be executed within a virtualized environment. Other technologies aside from hardware virtualization can provide isolated user space instances, also referred to as data compute nodes. Data compute nodes may include non-virtualized physical hosts, virtual machines (VMs), containers that run on top of a host operating system without a hypervisor or separate operating system, and/or hypervisor kernel network interface modules, among others. Hypervisor kernel network interface modules are non-VM data compute nodes that include a network stack with a hypervisor kernel network interface and receive/transmit threads.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

A reservation is a set of information technology (IT) resources (e.g., processing resources, memory resources, and/or network resources, among others) carved out of a cluster of virtualization capable hosts. A reservation can be a minimum guarantee of one or more IT resources. A reservation can provide for provisioning of an application and/or a workload. In contrast to some previous approaches that only allowed for the creation of reservations based on a cluster of virtual machine hosts, some embodiments of the present disclosure provide for mixed reservations based on virtual machine hosts and container hosts. A container host can be a physical machine or a virtual machine that includes a container virtualization layer (e.g., Docker).

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a block diagram of a host and a system for a reservation for a multi-machine application according to a number of embodiments of the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a first number of virtual machines 106-1, 106-2, . . . , 106-M that each include a container virtualization layer 107-1, 1072, . . . , 107-M respectively. The hypervisor 104 can execute a second number of virtual machines 106-3, 106-4, . . . , 106-N that do not specifically include a container virtualization layer. With respect to the virtual machines 106, the host 102 can be regarded as a virtual machine host. With respect to a container provisioned from a container image provided by a virtual machine (e.g., virtual machine 106-1) that includes a container virtualization layer (e.g., container virtualization layer 107-1), the virtual machine and the container virtualization layer can be regarded as a container host. Other examples of container hosts (not illustrated in FIG. 1) include physical machines. The virtual machines 106 can be provisioned with processing resources 108 and/or memory resources 110 and can communicate via the network interface 112. The processing resources 108 and the memory resources 110 provisioned to the virtual machines 106 can be local and/or remote to the host 102. For example, in a software defined data center, the virtual machines 106 can be provisioned with resources that are generally available to the software defined data center and not tied to any particular hardware device. By way of example, the memory resources 110 can include volatile and/or non-volatile memory available to the virtual machines 106. The virtual machines 106 can be moved to different hosts (not specifically illustrated), such that a different hypervisor manages the virtual machines 106. In some embodiments, the virtual machines 106-1, 106-2, . . . , 106-M that include container virtualization layers 107 can be on a different host than the virtual machines 106-3, 106-4, . . . , 106-N that do not include virtualization layers. Some embodiments may include only virtual machines 106-1, 106-2, . . . , 106-M that include virtualization layers 107.

The host 102 can be in communication with a reservation for a multi-machine application system 114. An example of the reservation for a multi-machine application system is illustrated and described in more detail with respect to FIG. 6. In some embodiments, the reservation for a multi-machine application system 114 can be a server.

Figure 2:
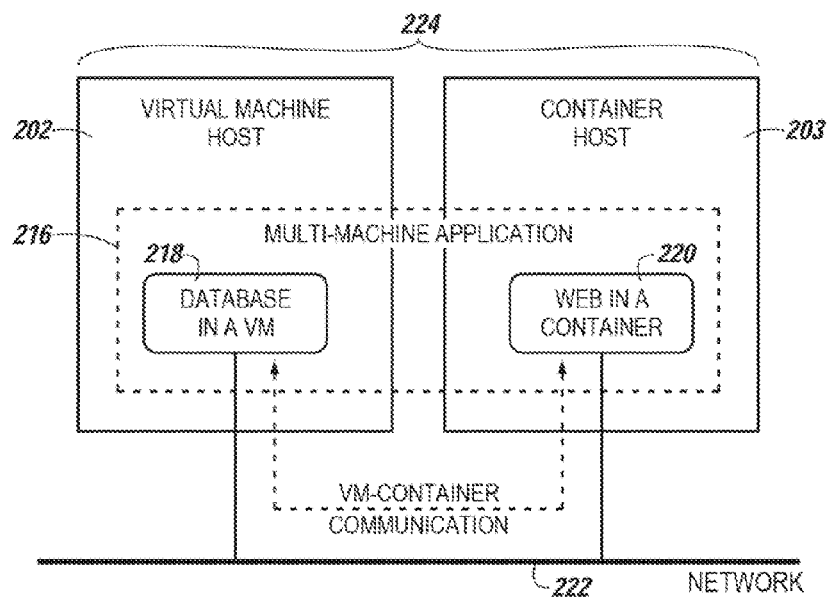
FIG. 2 is a block diagram of a multi-machine application spanning a virtual machine host and a container host according to a number of embodiments of the present disclosure.

FIG. 2 is a block diagram of a multi-machine application spanning a virtual machine host and a container host according to a number of embodiments of the present disclosure. A cluster of hosts 224 can include a virtual machine host 202 and a container host 203. The virtual machine host 202 can be analogous to the host 102 illustrated in FIG. 1. The container host 203 can be a physical machine, such as a Linux machine, or a virtual machine that includes a container virtualization layer, such as Docker. The cluster of hosts 224 may be located in a same data center, but embodiments are not so limited, as the virtual machine host 202 and the container host 203 can be remote from each other.

A multi-machine application 216 ma represent a use case that calls for a web server 220 (e.g., Apache database server) and a database server 216 (e.g., Microsoft SQL database server). The web server 220 is a relatively lightweight web server that serves hypertext transfer protocol requests. Therefore, deploying the web server 220 in as container can be more resource efficient and/or less expensive than deploying a virtual machine. Furthermore, deploying a container versus a virtual machine in a cloud environment can provide advantages including portability, fast provisioning, etc. The database server 218 is supported on a Windows platform and will typically use more processing ability than the web server 220. Therefore it can be more practical to deploy the database server 218 on a virtual machine instead of a container.

To address the use case explained above, a multi-machine blueprint can be defined (e.g. by a cloud management engine) to contain the web server 220 hosted in a container and the database server 218 hosted in a virtual machine. An instance of such a multi-machine blueprint can deploy the web server 220 in a container that is provisioned from a reservation from a container host 203 and deploy the database server 218 in a virtual machine that is provisioned from the reservation from a virtual machine host 202. The virtual machine hosting the database server 218 can coexist with the container hosting the web server 220 in the multi-machine application 216. The multi-machine blueprint can include a definition of networking between the servers (e.g., using network 222, which can be a virtual network, as described in more detail herein). After the blueprint is deployed, no further definition of networking may be necessary, thus the servers can be deployed without worrying about networking for the multi-machine application.

Figure 3:
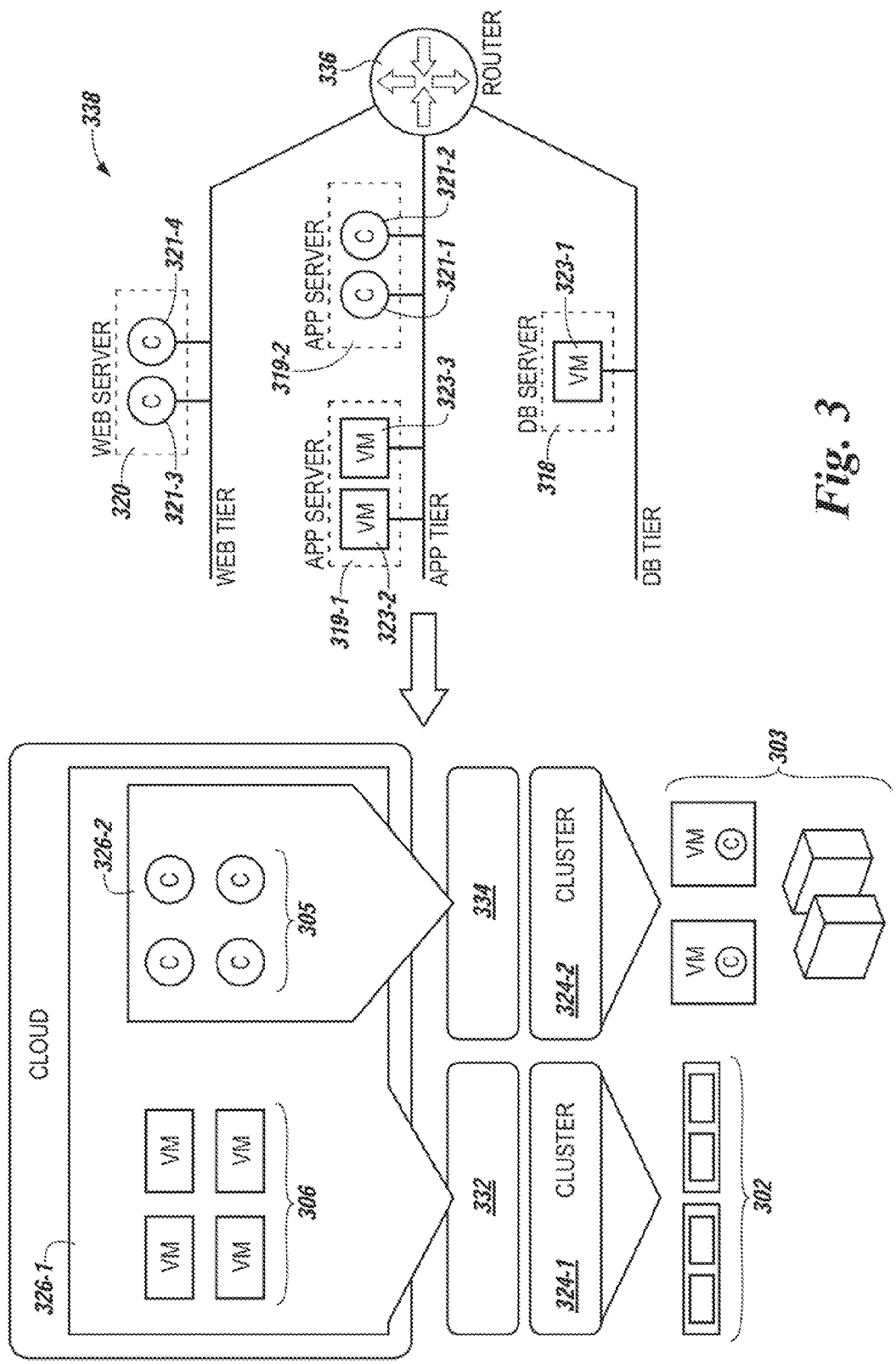
FIG. 3 is a block diagram of a mixed reservation of information technology resources and a deployed multi-machine blueprint according to a number of embodiments of the present disclosure.

FIG. 3 is a block diagram of a mixed reservation of IT resources and a deployed multi-machine blueprint according to a number of embodiments of the present disclosure. A multi-machine blueprint can be created by a cloud management engine (e.g., using an API). Once the multi-machine blueprint is created, it can be deployed any number of times to provide a respective multi-machine application for any number of users (e.g., customers) who desire such a multi-machine application fitting the multi-machine blueprint.

The multi-machine blueprint can include a virtual machine template, a container image, and a definition of networking therefor. The deployed multi-machine blueprint 338 illustrates a number of virtual machine templates 323-1, 323-2, 323-3 and a number of container images 321-1, 321-2, 321-3, 321-4. The deployed multi-machine template 338 includes the virtual machine template 323-1 for a database server 318 and the virtual machines templates 323-2, 323-3 for a first application server 319-1. The deployed multi-machine blueprint 338 includes the container images 321-1, 321-2 for a second application server 319-2 and the container images 321-3, 321-4 for a web server 320. Different application servers 319 may have different characteristics that make it more advantageous to use a container versus a virtual machine, which is why the deployed multi-machine blueprint 338 includes virtual machine templates 323-2, 323-3 for a first application server 319-1 and container images 321-1, 321-2 for a second application server 319-2.

The deployed multi-machine blueprint 338 can also include a definition of networking for the number of virtual machine templates 323 and the number of container images 319. In some instances, the definition of networking can include at least one virtual machine template 323-1 on a different Layer 3 network than at least one container image 321-3 connected by a router 336. In some instances, the definition of networking can include at least one virtual machine template 323-2 on a same Layer 2 broadcast domain as at least one container image 321-1. Although not specifically illustrated, the deployed multi-machine blueprint 338 can include a definition of load balancing, network security, and/or policy-based management settings, among others.

The multi-machine blueprint 338 can be created from a mixed reservation 326-1 of IT resources from a cluster of hosts. The mixed reservation 326-1 can include a reservation 326-2 of IT resources that is specific to containers. An example of such a reservation 326-2 is described in more detail with respect to FIG. 4. The cluster 324 of hosts is illustrated in FIG. 3 as a cluster 324-1 of virtual machine hosts and a cluster 324-2 of container hosts. The cluster 324 of hosts can include virtual machine hosts 302 in cluster 324-1 and container hosts 303 (e.g., virtual machines including container virtualization layers and/or physical machines) in cluster 324-2. A server virtualization engine can create the mixed reservation 326-1 of IT resources from the clusters 324 through a network virtualization manger 332 and a container virtualization manager 334. In some embodiments, the mixed reservation can be created by a server virtualization engine (e.g., using an API).

Containers 305 can be provisioned (from the reserved IT resources) from the container images 321 as part of the multi-machine application that the multi-machine blueprint is deployed to provide. Virtual machines 306 can be provisioned from the virtual machine templates 323 as part of the multi-machine application that the multi-machine blueprint is deployed to provide. Servers (e.g., database servers 318, application servers 319, and/or web servers 320, among others) can be deployed in the containers 305 that are provisioned from the container images 321 and/or the virtual machines 306 that are provisioned from the virtual machine templates 323. Collectively, the deployed servers can be a realization of an instance for a multi-machine application of the multi-machine blueprint.

Figure 4:
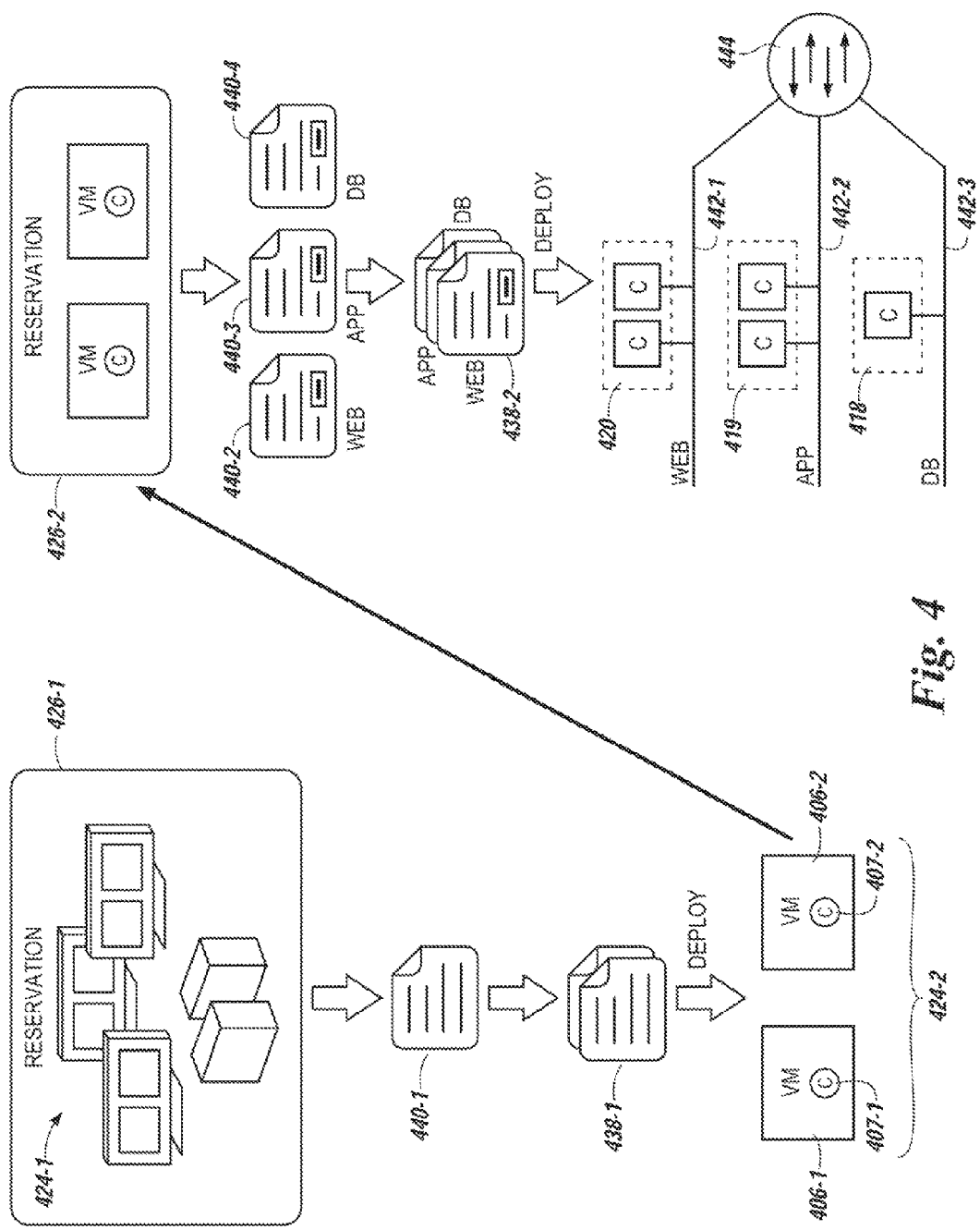
FIG. 4 is a flow chart illustrating a number of methods for a reservation for a multi-machine application according to a number of embodiments of the present disclosure.

FIG. 4 is a flow chart illustrating a number of methods for a reservation for a multi-machine application according to a number or embodiments of the present disclosure. A reservation 426-1 of IT resources can be carved out of a cluster of hosts 424-1. The reservation 426-1 can be a share of memory resources, processing resources, network resources. For example, the reservation 426-1 can be allocated to a business group such as a finance department for their applications. From the reservation 426-1 a single-machine blueprint 440-1 can be cloned from a snapshot of a virtual machine having a container virtualization layer. A multi-machine blueprint 438-1 can be created from multiple single-machine blueprints 440-1. Network and security settings can be applied to the multi-machine blueprint 438-1. In some embodiments, the settings can be applied to individual components of the multi-machine blueprint 438-1. The multi-machine blueprint 438-1 can be deployed to provide a multi-machine service instance. In the example illustrated in FIG. 4, the service instance includes a number of virtual machines 406-1, 406-2 including container virtualization layers 407-1 407-2, which can be treated as a cluster of hosts 424-2 (e.g., container hosts).

A new reservation 426-2 of IT resources can be created from the cluster 424-2 of container hosts that include the container virtualization layers 407-1, 407-2. Treating the virtual machines 406-1, 406-2 as a cluster 424-2 of container hosts allows them to deploy containers and communicate with other containers using tunneling. Single-machine blueprints 440-2, 440-3, 440-4 can be created from the reservation 426-2 and can include container images. A multi-machine blueprint 438-2 can be created from the single-machine blueprints 440-2, 440-3, 440-4. Networking can be defined for the multi-machine blueprint 438-2 as described herein. In some embodiments, security and/or load balancing settings can also be defined for the multi-machine blueprint 438-2. The multi-machine blueprint 438-2 can be deployed to provide a multi-machine application without further definition of networking after deployment. The networking can be defined to include network bridges 442-1, 442-2, 442-3 connected to a virtual switch 444, such as an open virtual switch. In some embodiments, each of the network bridges 442-1, 442-2, 442-3 can correspond to a respective server type of the multi-machine application and connect each server of the respective type. For example, network bridge 442-1 can correspond to a web server 420, network bridge 442-2 can correspond to an application server 419, and network bridge 442-3 can correspond to a database server 418. In some embodiments, a routing table can be configured in each container host of the cluster 424-2 of container hosts at runtime.

Figure 5:
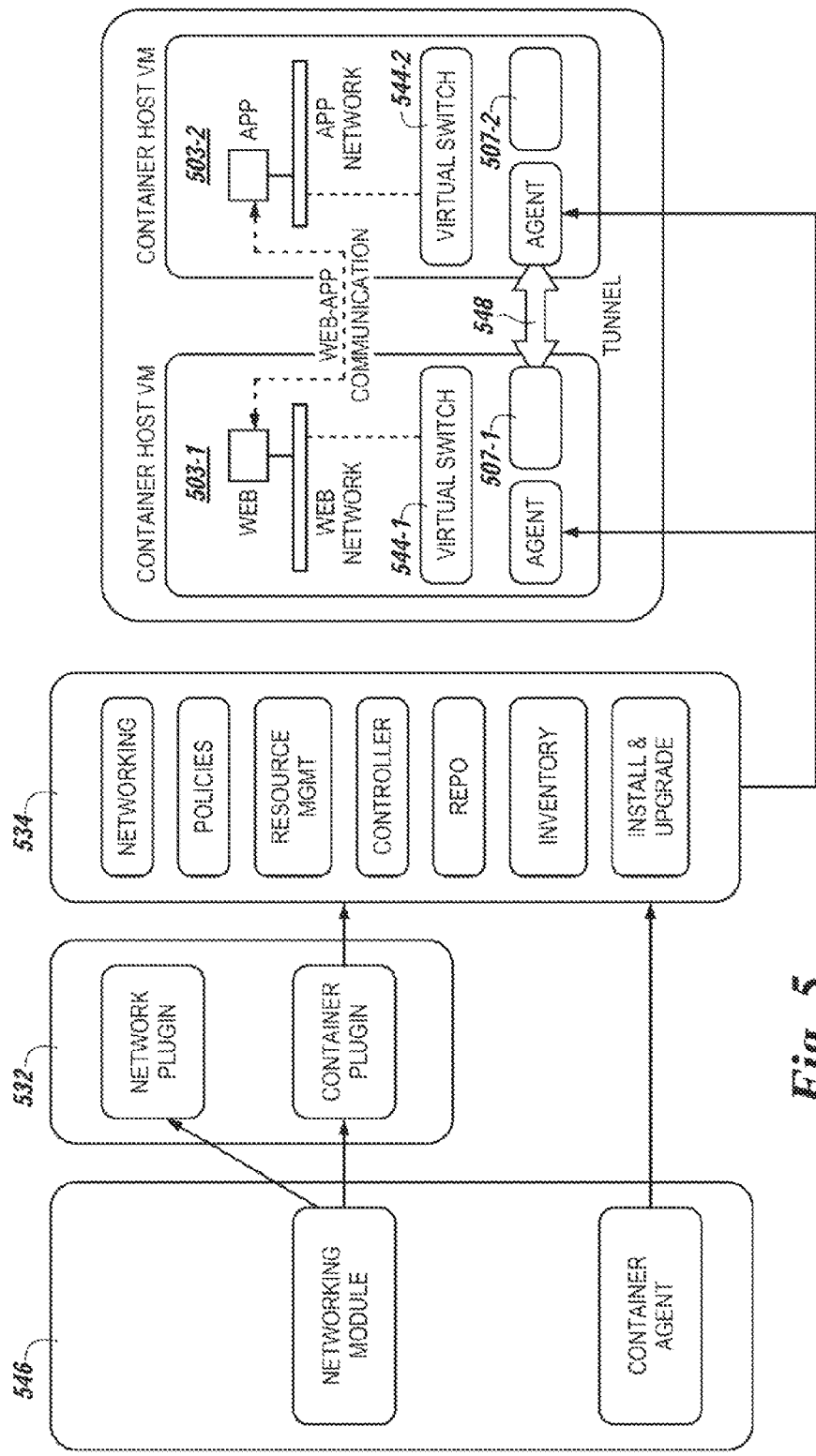
FIG. 5 is a block diagram of an architecture for a reservation for a multi-machine application according to a number of embodiments of the present disclosure.

FIG. 5 is a block diagram of an architecture for a reservation for a multi-machine application according to a number of embodiments of the present disclosure. The architecture includes a cloud management engine 546, which is in communication with a network virtualization manager 532, which is in communication with a container virtualization manager 534. The cloud management engine 546 can include a networking module, which is in communication with a network plugin and container plugin of the network virtualization manager. The cloud management engine 546 can include a container agent, which is in communication with the container virtualization manger 534. The cloud management engine 546 can be analogous to the cloud management engine 646 illustrated in FIG. 6. The container virtualization manager 534 can be analogous to the server virtualization engine 664 illustrated in FIG. 6, but specific to containers. The network virtualization manger 534 can be responsible for configuring networking for container images using the container plugin. The container plugin can include high level workflows for deployment of containers and networking based on instructions received from the cloud management engine 546 (e.g., via the networking module).

The container virtualization manager 534 can include a networking module, a policies module, a resource management module, a controller, a repo module, an inventory module, and an install and upgrade module, however embodiments are not so limited as the container virtualization manager 534 can include more or fewer modules that illustrated in FIG. 5. The policies module can store and/or communicate policies, such as network security, load balancing, etc., downstream with the container hosts 503-1, 503-2 and/or upstream with the network virtualization manager 532 and/or cloud management engine 546. The resource management module can monitor reservations of IT resources from the container hosts 503-1, 503-2 and report the same upstream to the network virtualization manager 532 and/or cloud management engine 546. The controller can execute instructions to provide functionality for the container virtualization manager. The repo module can release previously reserved IT resources from the container hosts 503-1, 503-2 in response to a reservation expiring and/or in response to a multi-machine blueprint being deleted. The inventory module can store and/or communicate information regarding the number of container hosts 503-1, 503-2 with which the container virtualization manager 534 is in communication. The install and upgrade module can store and/or communicate instructions comprising changes to the configuration of container images included in a multi-machine blueprint.

The networking module of the container virtualization manager 534 can interface with the container plugin to receive instructions from the cloud management engine 546, specifically, from the networking module of the cloud management engine 546. The networking module of the container virtualization manager 534 can also interface with networking agents on container hosts 503-1, 503-2 (e.g., container host virtual machines including container virtualization layers 507-1, 507-2) to provide a definition of networking for a multi-machine blueprint as described herein. The networking agents can be representational state transfer services that arrange containers based on requests received from the container virtualization manager 534. The networking agents can facilitate the creation of networks, tunnels, load balancing, and deployment of containers. The networking agents can store a routing table for a virtual network. A virtual extensible local area network tunnel can be defined between network bridges via a virtual switch 544-1, 544-2, which can be analogous to the virtual switch 444 illustrated in FIG. 4. As illustrated in FIG. 5, the virtual switch 544-1, 544-2 can be distributed across the container hosts 503-1, 503-2.

Figure 6:
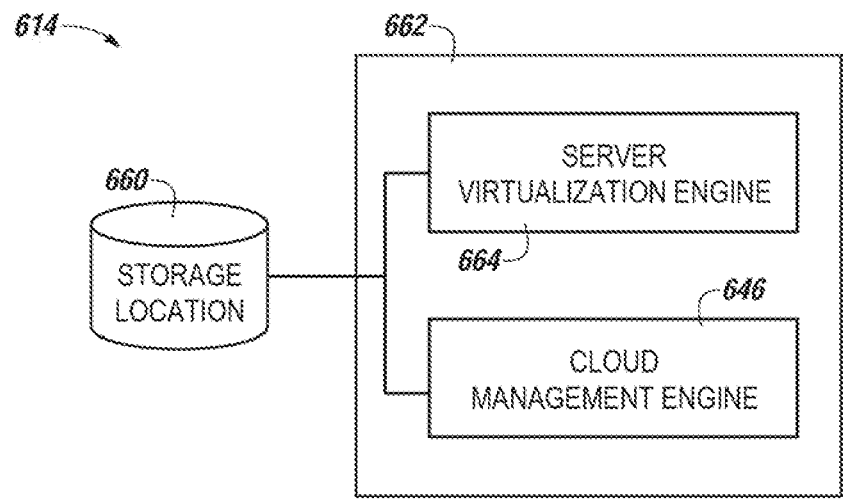
FIG. 6 is a diagram of a system for a reservation for a multi-machine application according to a number of embodiments of the present disclosure.

FIG. 6 is a diagram of a system for a reservation for a multi-machine application according to a number of embodiments of the present disclosure. The system 614 can include a storage location 660, a subsystem 662, and/or a number of engines, for example server virtualization engine 664 and/or cloud management engine 646 and can be in communication with the storage location 660 via a communication link. The system 614 can include additional or fewer engines than illustrated to perform the various functions described herein. The system can represent program instructions and/or hardware of a machine (e.g., machine 766 as referenced in FIG. 7, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the server virtualization engine 664 can include a combination of hardware and program instructions that is configured to create a mixed reservation of IT resources from a cluster of hosts including a virtual machine host and a container host. The IT resources can include physical IT resources used in the software defined data center, for example, compute, storage, and network physical resources such as processors, memory, and network appliances. The container hosts can be physical machines (e.g., Linux machines) or virtual machines including a container virtualization layer (e.g., Docker).

In some embodiments, the cloud management engine 646 can include a combination of hardware and program instructions that is configured to create a multi-machine blueprint from the mixed reservation including a virtual machine template, a container image, and a definition of networking therefor. The cloud management engine 646 can include a combination of hardware and program instructions that is configured to deploy the multi-machine blueprint to provide a multi-machine application.

The server virtualization engine 664 can include a combination of hardware and program instructions that is configured to provision a container from the container image as part of the multi-machine application and to provision a virtual machine from the virtual machine template as part of the multi-machine application. A container image can be a read-only layer, whereas, the container provisioned from the container image can be a read-write layer. Similarly, a virtual machine template (e.g., a snapshot) can be read-only, whereas the virtual machine provisioned from the virtual machine template can be read-write.

As described herein, the multi-machine application can include a plurality of servers. The server virtualization engine 664 can include a combination of hardware and program instructions that is configured to deploy a first server of the plurality of servers in the container according to the multi-machine blueprint. The server virtualization engine 664 can include a combination of hardware and program instructions that is configured to deploy a second server of the plurality of servers in the virtual machine according to the multi-machine blueprint. The multi-machine blueprint may have been created with the intention of deploying various servers based on a threshold resource requirement. Advantageously, according to a number offer of the present disclosure, IT resources can be used more efficiently with containers providing for relatively lightweight servers as opposed to a virtual machine.

The server virtualization engine 664 can include a combination of hardware and program instructions that is configured to deploy a first server of the plurality of servers in the container according to the multi-machine blueprint. The server virtualization engine 664 can include a combination of hardware and program instructions that is configured to deploy a second server of the plurality of servers in the virtual machine according to the multi-machine blueprint. The multi-machine blueprint may have been created with the intention of deploying various servers based on a threshold anticipated load. Advantageously, according to a number of embodiments of the present disclosure, IT resources can be used more efficiently with containers providing for relatively lightweight servers as opposed to a virtual machine.

The server virtualization engine 664 can include a combination of hardware and program instructions that is configured to deploy a first server of the plurality of servers in the container according to the multi-machine blueprint. The server virtualization engine 664 can include a combination of hardware and program instructions that is configured to deploy a second server of the plurality of servers in the virtual machine according to the multi-machine blueprint. For example, the first type of server can be a web server and the second type of server can be a database server.

In some embodiments, the cloud management engine 646 can include a combination of hardware and program instructions that is configured to create the multi-machine blueprint including the definition of networking with the virtual machine template and the container image on the same Layer 2 broadcast domain. In some embodiments, the cloud management engine 646 can include a combination of hardware and program instructions that is configured to create the multi-machine blueprint including the definition of networking with the virtual machine template and the container image on different Layer 3 networks connected by a router. The cloud management engine 646 can include a combination of hardware and program instructions that is configured to deploy the multi-machine blueprint to provide the multi-machine application without further definition of networking after deployment.

Figure 7:
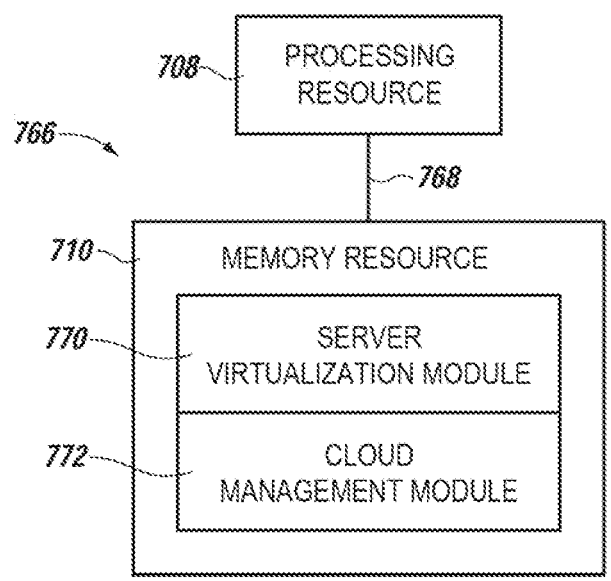
FIG. 7 is a diagram of a machine for a reservation for a multi-machine application according to a number of embodiments of the present disclosure.

FIG. 7 is a diagram of a machine for a reservation for a multi-machine application according to a number of embodiments of the present disclosure. The machine 766 can utilize software, hardware, firmware, and/or logic to perform a number of functions. The machine 766 can be a combination of hardware and program instructions configured to perform a number of functions (e.g., actions). The hardware, for example, can include a number of processing resources 708 and a number of memory resources 710, such as a machine-readable medium (MRM) or other memory resources 710. The memory resources 710 can be internal and/or external to the machine 766 (e.g., the machine 766 can include internal memory resources and have access to external memory resources). In some embodiments, the machine 766 can be a virtual machine. The program instructions (e.g., machine-readable instructions (MRI)) can include instructions stored on the MRM to implement a particular function (e.g., an action such as creating a reservation of information technology resources from a cluster of container hosts). The set of MRI can be executable by one or more of the processing resources 708. The memory resources 710 can be coupled to the machine 766 in a wired and/or wireless manner. For example, the memory resources 710 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 710 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 708 can be coupled to the memory resources 710 via a communication path 768. The communication path 768 can be local or remote to the machine 766. Examples of a local communication path 768 can include an electronic bus internal to a machine, where the memory resources 710 are in communication with the processing resources 708 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 768 can be such that the memory resources 710 are remote from the processing resources 708, such as in a network connection between the mammy resources 710 and the processing resources 708. That is, the communication path 768 can be a network connection. Examples of such a network connection can include a local area network (LAN), wide area network (WAN), personal area network (PAN), and the Internet, among others.

As shown in FIG. 7, the MRI stored in the memory resources 710 can be segmented into a number of modules 770, 772 that when executed by the processing resources 708 can perform a number of functions. As used herein a module includes a set of instructions included to perform a particular task or action. The number of modules 770, 772 can be sub-modules of other modules. For example, the server virtualization module 770 can be a sub-module of the cloud management module 772 and/or can be contained within a single module. Furthermore, the number of modules 770, 772 can comprise individual modules separate and distinct from one another. Examples are not limited to the specific modules 770, 772 illustrated in FIG. 7.

Each of the number of modules 770, 772 can include program instructions and/or a combination of hardware and program instructions that, when executed by a processing resource 708, can function as a corresponding engine as described with respect to FIG. 6. For example, the server virtualization module 770 can include program instructions and/or a combination of hardware and program instructions that, when executed by a processing resource 708, can function as the server virtualization engine 664 and/or the cloud management module 772 can include program instructions and/or a combination of hardware and program instructions that, when executed by a processing resource 708, can function as the cloud management engine 646.

The machine 766 can include a server virtualization module 770, which can include instructions to create a reservation of IT resources from a cluster of container hosts. Each container host can be a respective virtual machine including a container virtualization layer.

The machine 766 can include a cloud management module 772, which can include instructions to create a plurality of single-machine blueprints from the reservation, each single-machine blueprint including a respective container image. The cloud management module 772 can include instructions to create a multi-machine blueprint from the plurality of single-machine blueprints. The instructions to define the logical network can include instructions to define a respective virtual extensible local area network tunnel between the plurality of network bridges via the virtual switch. The cloud management module 772 can include instructions to distribute the virtual switch across the container hosts. The cloud management module 772 can include instructions to configure a respective routing table in each container host of the cluster of container hosts at runtime. The cloud management module 772 can include instructions to apply security settings for the multi-machine blueprint.

The cloud management module 772 can include instructions to define networking for the multi-machine blueprint. For example, the instructions to define networking can include instructions to define a logical network as a plurality of network bridges connected to a virtual switch (e.g., an Open Virtual Switch). Each of the plurality of network bridges can correspond to a respective server type of the multi-machine application. For example, the virtual network can include one or more of a web server bridge, an application server bridge, and/or a database server bridge, among others. The cloud management module 772 can include instructions to deploy the multi-machine blueprint to provide a multi-machine application without further definition of networking after deployment.

Figure 8:
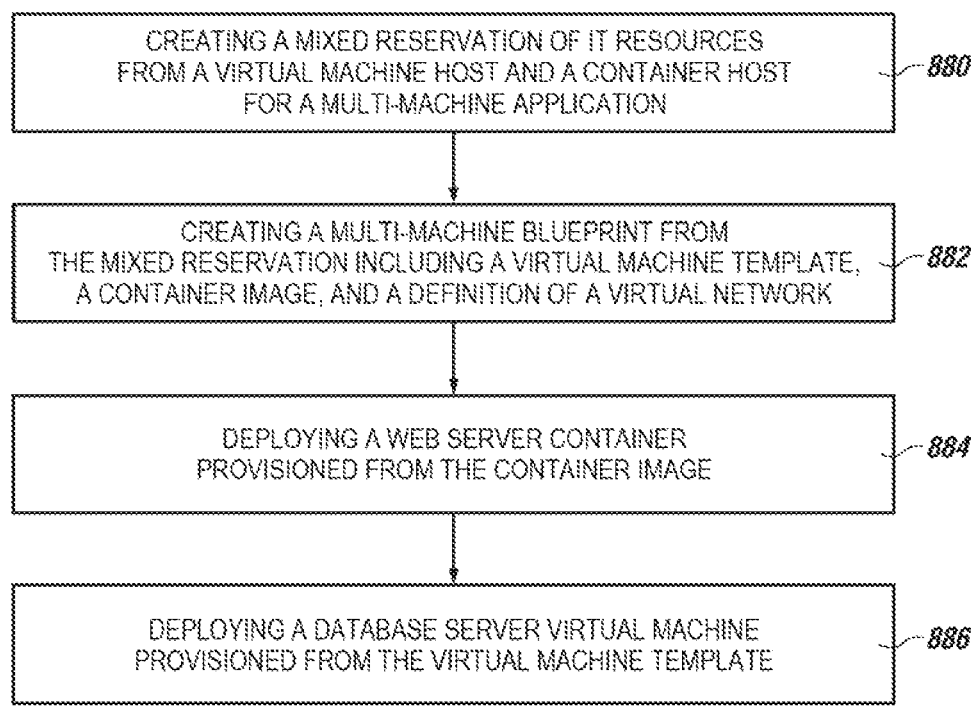
FIG. 8 is a flow chart illustrating a number of methods for a reservation for a multi-machine application according to a number of embodiments of the present disclosure.

FIG. 8 is as flow chart illustrating a number of methods for a reservation for a multi-machine application according to a. number of embodiments of the present disclosure. At 880 the method can include creating a mixed reservation of IT resources from a virtual machine host and a container host for a multi-machine application. Creating the mixed reservation of IT resources can include creating a mixed reservation of processing resources, memory resources, and networking resources. In some embodiments, the method can include running the container host on a virtual machine having a container virtualization layer. In some embodiments, the method can include running the container host on a physical machine.

At 882, the method can include creating a multi-machine blueprint from the mixed reservation including a virtual machine template, a container image, and a definition of a virtual network between the virtual machine template and the container image. At 884, the method can include deploying a web server container provisioned from the container image in the container host. At 886, the method can include deploying a database server virtual machine provisioned from the virtual machine template in the virtual machine host.

In some embodiments, the method can include creating a first single-machine blueprint from the mixed reservation including the virtual machine template and creating a second single-machine blueprint from the mixed reservation including the container image. Creating the multi-machine blueprint from the mixed reservation can include creating the multi-machine blueprint from the first and the second single-machine blueprints.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
    a number of processors;
    memory resources coupled to the processors, the memory resources storing instructions executable by the processors to:
        create a mixed reservation of information technology (IT) resources from a cluster of hosts including a virtual machine host and a plurality of container hosts, wherein the plurality of container hosts each include a respective networking agent;
        create a multi-machine blueprint from the mixed reservation including a virtual machine template for a first server type, a first container image for a second server type, a second container image for a third server type, and a definition of networking therefor; and
        deploy the multi-machine blueprint to provide a multi-machine application; wherein the definition of networking for the plurality of container hosts is provided via an interface with the respective networking agents, which facilitate creation of a network according to the definition of networking:
    wherein the definition of networking includes;
        a first network bridge connected to the first container image;
        a second network bridge connected to the second container image;
        a virtual extensible local area network tunnel between the first network bridge and the second network bridge via a virtual switch distributed across the plurality of container hosts; and
        the virtual machine template on a different Layer 3 network than the first container image and the second container image, connected by a router.

2. The system of claim 1, wherein the instructions are executable to:
    provision a container from the container image as part of the multi-machine application; and
    provision a virtual machine from the virtual machine template as part of the multi-machine application.

3. The system of claim 2, wherein the instructions are executable to:
    deploy a web server of the plurality of servers in the container; and
    deploy a database server of the plurality of servers in the virtual machine.

4. The system of claim 1, wherein the instructions are executable to deploy the multi-machine blueprint to provide a multi-machine application using the definition of networking in the multi-machine blueprint.

5. The system of claim 1, wherein the container hosts comprise one of a group of container hosts including physical machines and virtual machines including a container virtualization layer.

6. The system of claim 1, wherein the IT resources comprise processing resources, memory resources, and network resources.

7. The system of claim 1, wherein the networking agents comprise representational state transfer services that arrange containers based on requests received.

8. A non-transitory machine-readable medium storing instructions executable by a processing resource to cause a computing system to:
    create a reservation of information technology resources from a cluster of container hosts, wherein each container host comprises a respective virtual machine including a container virtualization layer and a respective networking agent;
    create a plurality of single-machine blueprints from the reservation each single-machine blueprint including a respective container image;

create a multi-machine blueprint from the plurality of single-machine blueprints;
define networking for the multi-machine blueprint via an interface with the respective networking agents, which facilitate creation of a network according to the definition of networking, wherein the instructions to define networking comprise instructions to:
define a logical network as a plurality of network bridges connected to a virtual switch and to distribute the virtual switch across the container hosts;
define a respective virtual extensible local area network tunnel between the plurality of network bridges via the virtual switch;
wherein each of the plurality of network bridges corresponds to a respective server type of the multi-machine application and connects each server of the respective type; and
deploy the multi-machine blueprint to provide a multi-machine application using the definition of networking in the multi-machine blueprint.

9. The medium of claim 8, including instructions to apply security settings for the multi-machine blueprint.

10. The medium of claim 8, including instructions to configure a respective routing table in each container host of the cluster of container hosts at runtime.

11. The medium of claim 8, wherein the networking agents comprise representational state transfer services that arrange containers based on requests received.

12. A method, comprising:
creating a mixed reservation of information technology (IT) resources from a virtual machine host, a first container host, and a second container host for a multi-machine application, wherein the first and the second of container hosts each include a respective networking agent;
creating a multi-machine blueprint from the mixed reservation including a virtual machine template for a first server type, a first container image for a second server type, a second container image for a third server type, and a definition of networking between the virtual machine template, the first container image, and the second container image;
deploying a web server container provisioned from the first container image in the first container host;
deploying an application server container provisioned from the second container image in the second container host; and
deploying a database server virtual machine provisioned from the virtual machine template in the virtual machine host;
providing the definition of networking for the first and the second container hosts via an interface with the respective networking agents, which facilitate creation of a network according to the definition of networking;
wherein the definition of networking includes:
a first network bridge connected to the first container image;
a second network bridge connected to the second container image;
a virtual extensible local area network tunnel between the first network bridge and the second network bridge via a virtual switch distributed across the first and the second container hosts; and
the virtual machine template on a different Layer 3 network than the first container image and the second container image, connected by a router.

13. The method of claim 12, wherein the method includes running the first container host on a virtual machine having a container virtualization layer.

14. The method of claim 12, wherein the method includes running the first container host on a physical machine.

15. The method of claim 12, wherein the method includes:
creating a first single-machine blueprint from the mixed reservation including the virtual machine template;
creating a second single-machine blueprint from the mixed reservation including the first container image; and
wherein creating the multi-machine blueprint from the mixed reservation comprises creating the multi-machine blueprint from the first and the second single-machine blueprints.

16. The method of claim 12, wherein creating the mixed reservation of IT resources comprises creating a mixed reservation of processing resources, memory resources, and network resources.

17. The method of claim 12, wherein the networking agents comprise representational state transfer services that arrange containers based on requests received.

* * * * *